(12) United States Patent
Hater et al.

(10) Patent No.: US 7,118,308 B2
(45) Date of Patent: Oct. 10, 2006

(54) MULTI-PLANAR GAS RECOVERY BIOREACTOR

(75) Inventors: Gary R. Hater, Cincinnati, OH (US); John A. Barbush, Goshen, KY (US); Chad A. Abell, New Albany, IN (US); Richard N. Barr, Sellersburg, IN (US)

(73) Assignee: Waste Management, Inc., Houston, TX (US)

( * ) Notice: Subject to any disclaimer, the term of this patent is extended or adjusted under 35 U.S.C. 154(b) by 0 days.

(21) Appl. No.: 10/877,637

(22) Filed: Jun. 25, 2004

(65) Prior Publication Data

US 2005/0286978 A1   Dec. 29, 2005

(51) Int. Cl.
  *B09B 1/00*   (2006.01)
(52) U.S. Cl. .................................. 405/129.95
(58) Field of Classification Search ........... 405/129.75, 405/129.2, 129.95, 129.7, 129.65, 129.85
  See application file for complete search history.

(56) References Cited

U.S. PATENT DOCUMENTS

| | | | |
|---|---|---|---|
| 4,323,367 A | 4/1982 | Ghosh | |
| 4,401,569 A | 8/1983 | Jhaveri et al. | |
| 4,810,131 A * | 3/1989 | Turner | 405/129.5 |
| 4,849,360 A | 7/1989 | Norris et al. | |
| 4,850,745 A | 7/1989 | Hater et al. | |
| 5,201,609 A * | 4/1993 | Johnson | 405/129.7 |
| 5,259,697 A | 11/1993 | Allen et al. | |
| 5,564,862 A | 10/1996 | Markels et al. | |
| 5,605,417 A | 2/1997 | Englert et al. | |
| 5,618,427 A | 4/1997 | Seech et al. | |
| 5,642,630 A * | 7/1997 | Abdelmalek et al. | 62/632 |
| 5,695,641 A | 12/1997 | Cosulich et al. | |
| 5,753,494 A | 5/1998 | Hater et al. | |
| 5,857,807 A * | 1/1999 | Longo, Sr. | 405/129.7 |
| 5,888,022 A | 3/1999 | Green | |
| 5,976,377 A | 11/1999 | Hyfantis, Jr. | |
| 5,984,580 A | 11/1999 | Ham et al. | |
| 6,024,513 A | 2/2000 | Hudgins et al. | |
| 6,033,559 A | 3/2000 | Bender et al. | |
| 6,283,676 B1 | 9/2001 | Hater et al. | |
| 6,398,958 B1 | 6/2002 | Hater et al. | |
| 6,481,929 B1 | 11/2002 | Layton et al. | |
| 6,742,962 B1 | 6/2004 | Hater et al. | |

FOREIGN PATENT DOCUMENTS

JP   11-216440   8/1999

OTHER PUBLICATIONS

Barber et al., "Leachate Recirculation: Full-Scale Experience", Landfilling of Waste: Leachate, pp. 381-401 (1992).
Matustato et al. "Stabilization Mechanism of Leachate from Semi-aerobic Sanitary Landfills of Organic-rich Waste", Proceedings Sardinia 91, pp. 876-888 (1991).
Stegman et al., "Enhancement of Biochemical Processes in Sanitary Landfills", International Sanitary Landfill Symposium, pp. 1-28 (1987).

* cited by examiner

*Primary Examiner*—John Kreck
(74) *Attorney, Agent, or Firm*—McDonnell Boehnen Hulbert & Berghoff LLP

(57) ABSTRACT

A bioreactor including one or more features that improve bioreactor liquid infiltration and gas recovery and having a central core including liquid infiltration piping, a porous gas recovery material including at least one gas collection pipe, and a berm separating the central core from the porous gas recovery material.

34 Claims, 6 Drawing Sheets

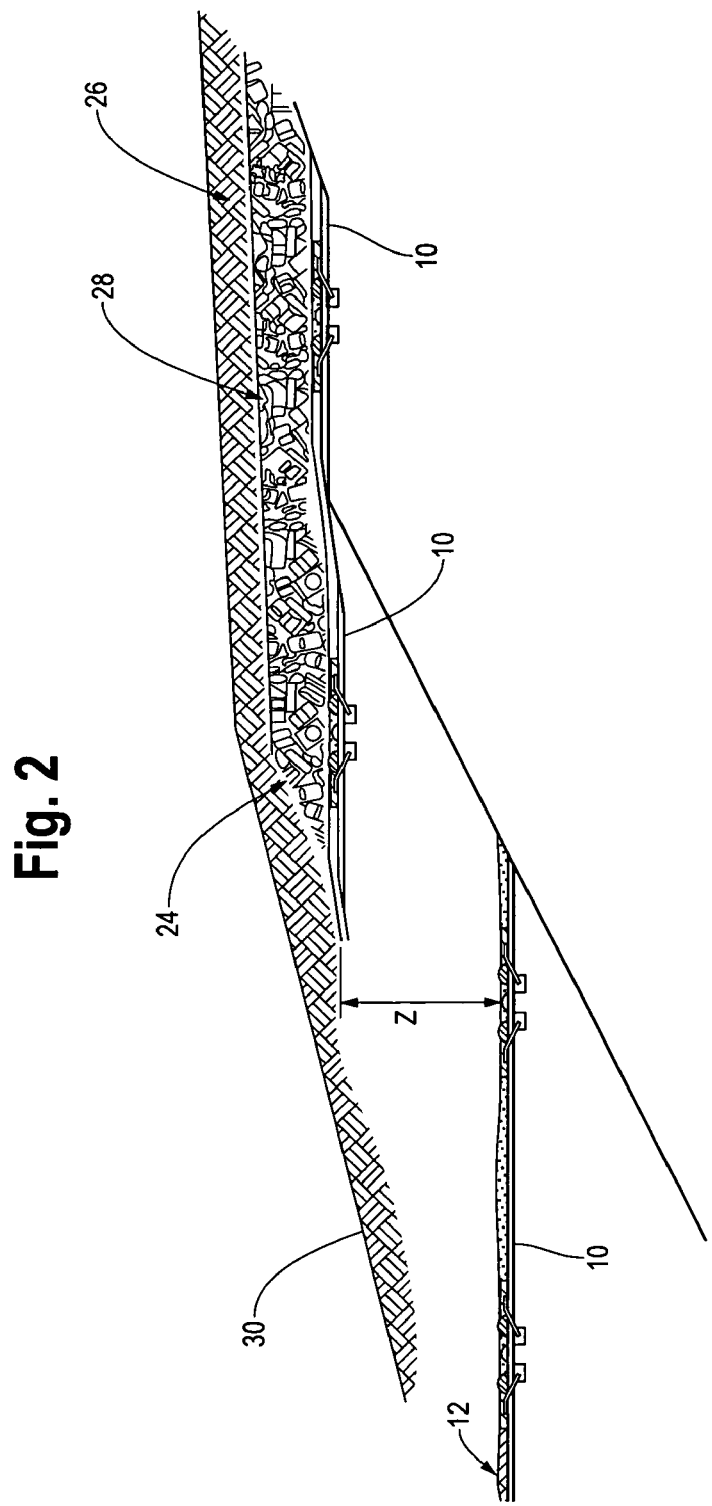

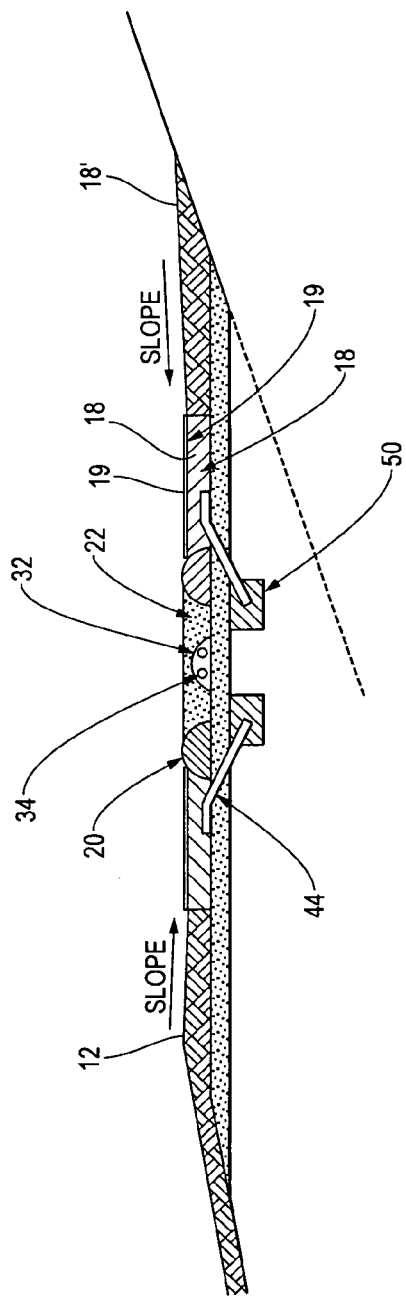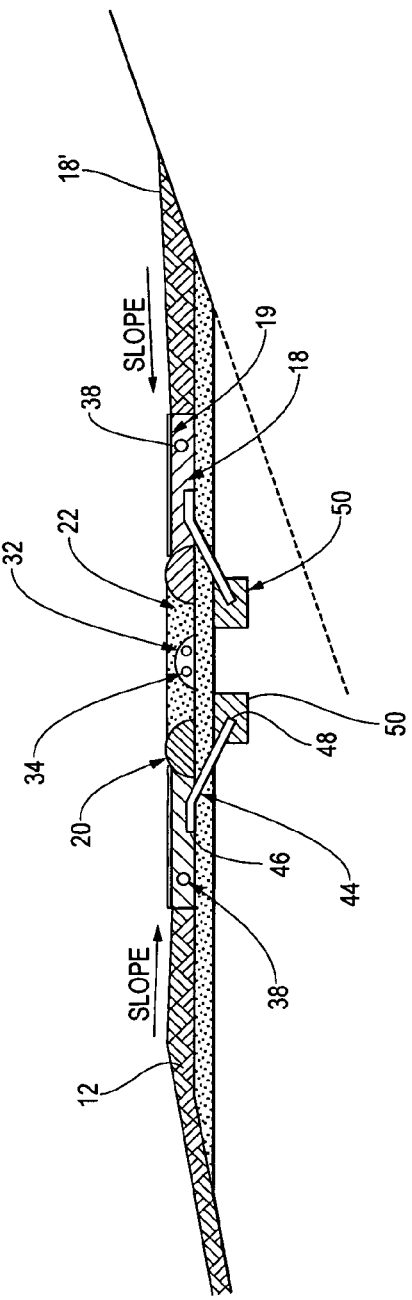

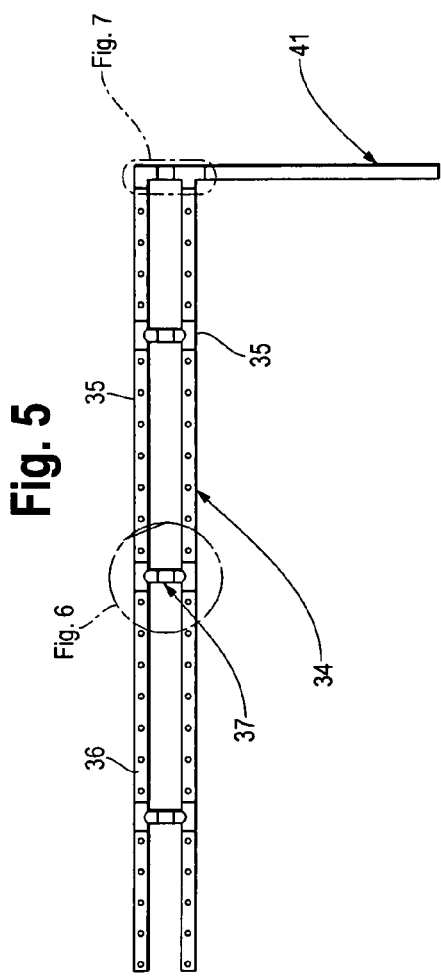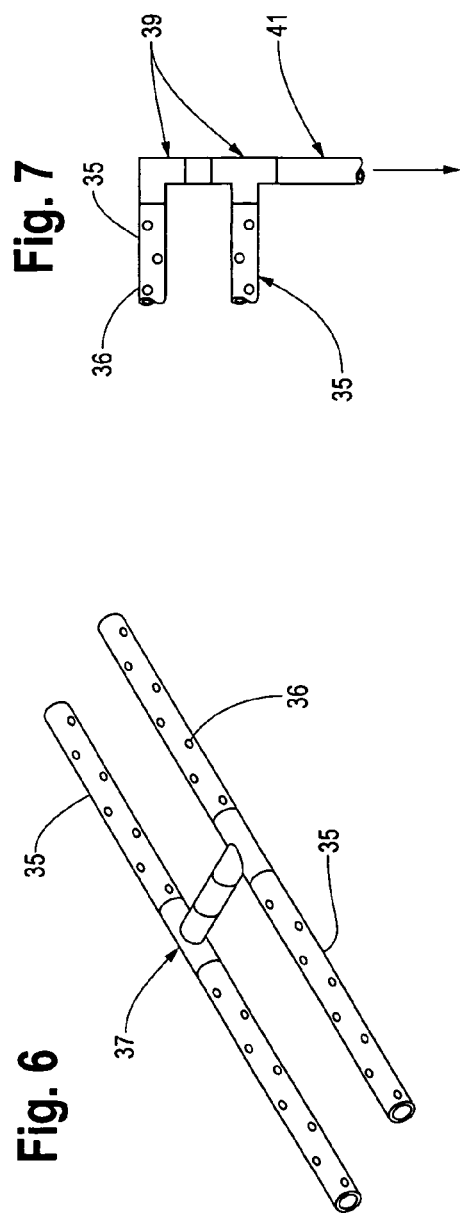

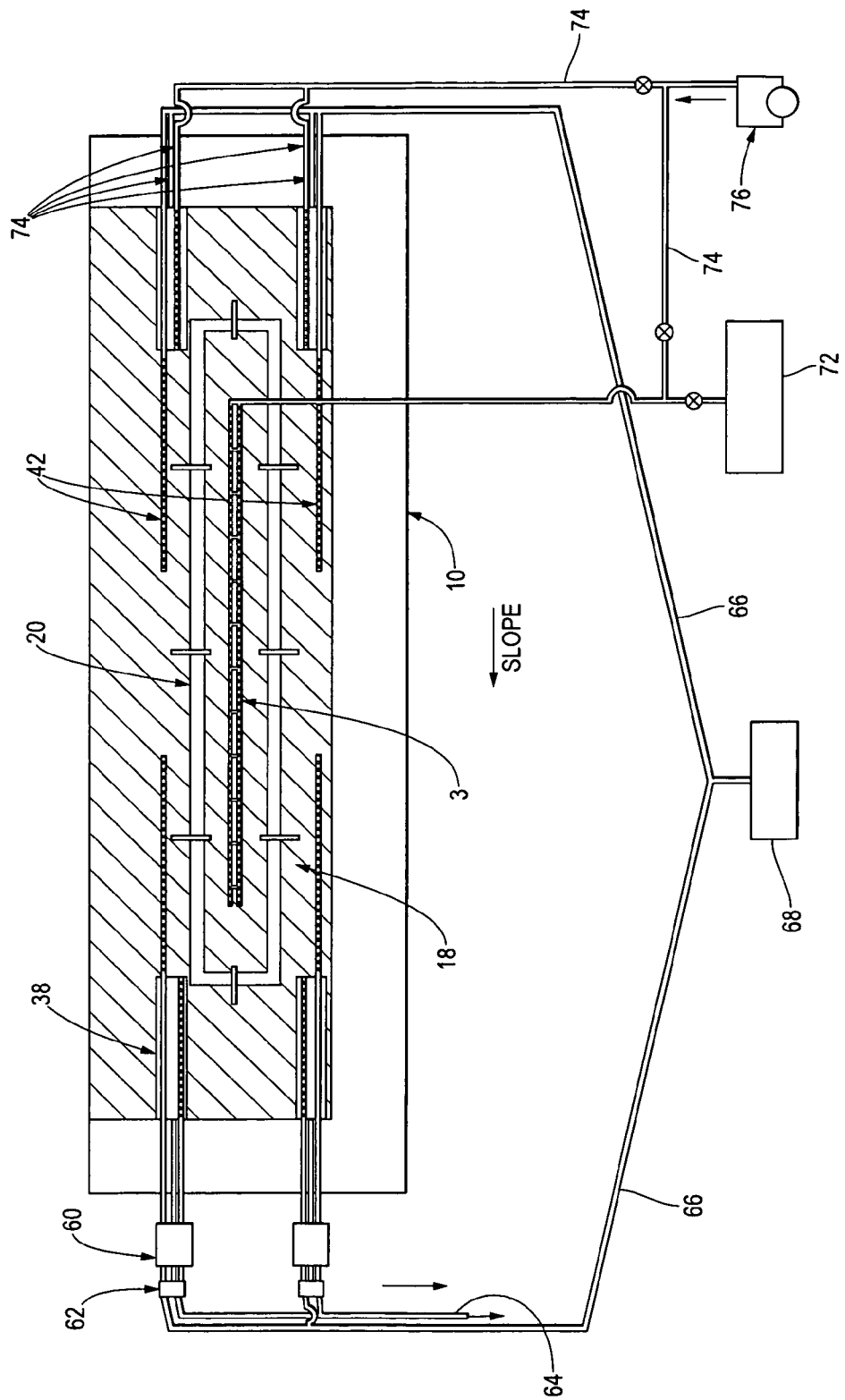

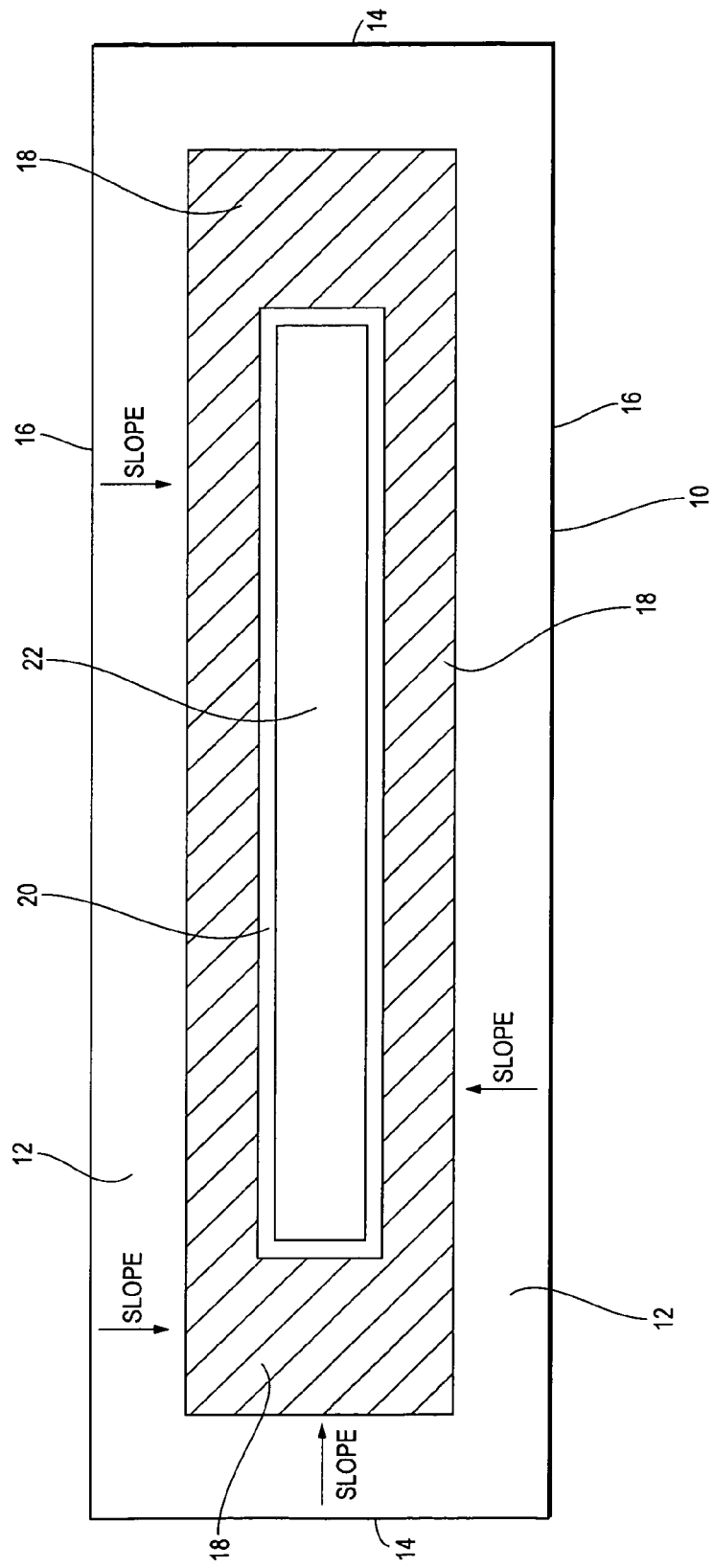

MULTI-PLANAR GAS RECOVERY BIOREACTOR

BACKGROUND OF THE INVENTION

1. Field of the Invention

The present invention relates to a bioreactor including one or more features that improve bioreactor liquid infiltration and gas recovery. The bioreactor of this invention described creates an extremely large area for infiltration and gas recovery. It further eliminates the vertical gas wells and replaces them, in part, with self draining angular wells in the infiltration area. The surface area for gas recovery based on the porous media supplied is an order of magnitude greater than the vertical well based gas recovery systems.

2. Description of the Art

About 15 years ago, landfill owners began using leachate recirculation as a remediation method. The dominant techniques have been to inject leachate into landfills using horizontal leachate piping, vertical wells, or applying leachate to the working landfill face surface. Distribution of the liquid over a large area has always been concern. Often landfill material surrounding the leachate injection sites become clogged with slime, fines or calcium/iron complexes. Additionally, the gas recovery wells, that are typically vertical, often filled with water and or leachate. These flooded wells resulted in poor gas collection and the need to place expensive liquid pumps in the gas well casings.

Differential landfill settlement complicates compliance with the environmental regulations related to gas and simultaneously increases maintenance costs dramatically. Since the 1980s' over 90% of the landfill gas recovery systems in the United States and Canada use vertical gas extraction wells. Standard practice is to drill a 30" to 36" diameter well and insert a 6" to 8" diameter gas pipe and then fill the boring with stone. This system was designed for landfills that do not apply large volumes of liquid, such as leachate, to landfills. Over the years with the development of leachate recirculation, air operated pumps have become standard in wet landfills. This has resulted in a high maintenance costs. Along with these pumps, many landfills are increasing the density of the gas recovery wells.

Advances in landfill remediation have been made recently. U.S. Pat. No. 6,742,962 discloses a horizontal infiltration and gas recovery system. The system is designed to eliminate some of these problems with gas recovery in wet landfill systems. While the system is an improvement over vertical gas recovery systems it still requires liquid pumps associated with the gas recovery wells and the system is subject to oxygen intrusion if the cover soil is not properly compacted. Another issue with this system is the potential for limited liquid coverage due to non-homogeneous waste placement and chemical blinding of the trenches. U.S. Pat. No. 6,283,676 discloses systems that employ short-term compressed air addition into a landfill in order to initiate aerobic bacterial growth and degradation.

Despite these advances, there remain problems with existing leachate recirculation and/or landfill gas recovery systems including (1) the continued dependency on vertical gas wells; (2) The requirement to pump liquids out of vertical gas wells as the infiltration field became saturated; (3) historically, infiltration systems do not allow for surface application initially followed by deep infiltration and the landfill is filled for the apparatus is covered; (4) the need for a system that would allow for infiltration and gas recovery simultaneously. Furthermore, there is a need to be able to drain liquids from the gas collection system and improve gas recovery for the saturated infiltration field. Additionally gas systems in older wet landfills are prone to maintenance issues related to settling of the gas system. Vertical wells sheer off and crush and the interconnecting horizontal gas headers often water out.

SUMMARY OF THE INVENTION

In one aspect, this invention is a bioreactor comprising a compostable material and at least one bioreactor located in the compostable material wherein the bioreactor cell further comprises: (i) a central core including liquid infiltration piping; (ii) a porous gas recovery material including at least one gas collection pipe; and (iii) a berm separating the central core from the porous gas recovery material.

In another aspect, this invention is a method for constructing a landfill bioreactor comprising the steps of: (a) placing a layer of compostable material in a landfill; (b) locating a bioreactor comprising (i) a central core including liquid infiltration piping; (ii) a porous gas recovery material including at least one gas collection pipe; and (iii) a berm separating the central core from the porous gas recovery material on top of the layer of compostable material; and (c) placing a layer of material over the bioreactor.

In yet another aspect, this invention is a landfill including at least one bioreactor comprising a central core including liquid infiltration piping; (ii) a porous gas recovery material including at least one gas collection pipe; and (iii) a berm separating the central core from the porous gas recovery material on top of the layer of compostable material.

DESCRIPTION OF THE FIGURES

FIG. 2 is a side view of a landfill including a plurality of bioreactor embodiments of this invention wherein the bioreactors are located on the same or different horizontal planes;

FIG. 3 is a side cut-away view, along line A—A of the infiltration/gas recovery bioreactor embodiment of FIG. 1;

FIG. 4 is a side cut-away view, along line B—B of the infiltration/gas recovery bioreactor embodiment of FIG. 1;

FIG. 5 is a view of an infiltration pipe system useful in infiltration/gas recovery bioreactor embodiments of this invention;

FIG. 6 is a close up view of the portion of the infiltration pipe system designated by the letter C in FIG. 5;

FIG. 7 is a close up view of the portion of the infiltration pipe system designated by the letter D in FIG. 5;

FIG. 8 is an overhead view of a landfill including a bioreactor embodiment of this invention: and FIG. 9 is an overhead view of a stand-alone bioreactor embodiment of this invention.

DESCRIPTION OF THE CURRENT EMBODIMENT

Figure 1:
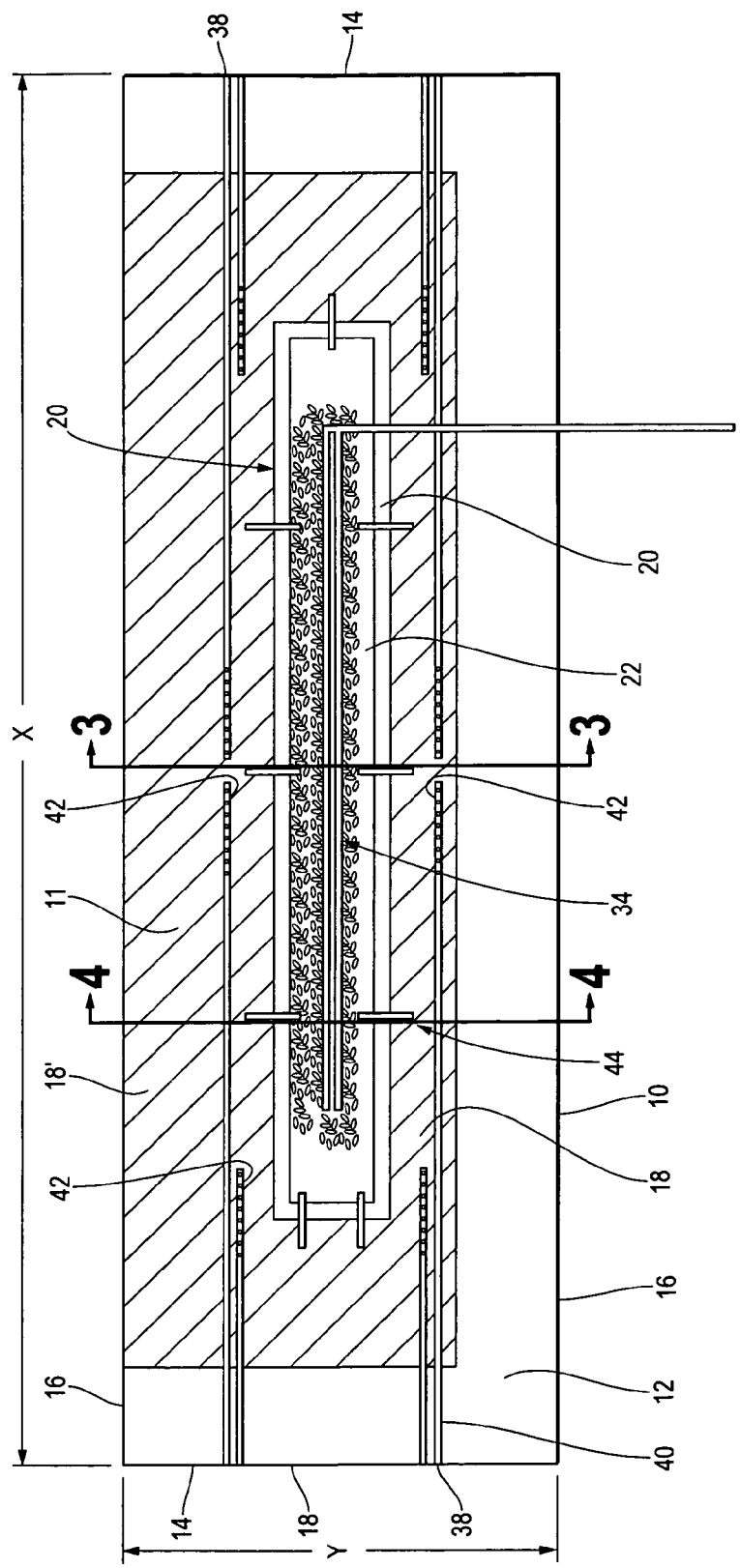
FIG. 1 is a top view of an embodiment of an infiltration/gas recovery bioreactor of this invention.

The present invention relates to a bioreactor including one or more features that improve bioreactor liquid infiltration and gas recovery. The bioreactor of this invention creates an extremely large area for infiltration and gas recovery. It further eliminates the vertical gas wells and replaces them, in part, with self draining angular wells in the infiltration area. The surface area for gas recovery based on the porous media supplied is an order of magnitude greater than the vertical well based gas recovery systems.

The present invention solves one or more of the following problems existing in prior art landfill liquid infiltration systems—with or without gas recovery. Specifically this invention does one or more the following or has one or more of the following features:

- eliminates vertical wells and their requisite dewatering pumps.
- moves horizontal gas headers from the interior of the landfill to the outer slopes where they can be easily maintained and drained;
- provides inner wells with improved drainage of the gas collection piping system by angling the gas collection pipes to facilitate automatic drainage back into the wet mass;
- may include an internal dam between the infiltration area and the gas collection area that forces moisture downward and away from the landfill edges;
- may include a geotextile such as Geonet or felt to inhibit liquid clogging of the gas collection area and to prevent solid waste fines from filling voids in the porous gas recovery material;
- may include the placement of a 10 to 30 mil plastic sheet below the long term or permanent cover of a landfill to improve surface gas emissions ad to make it easier to comply with New Source Pollutions Standards (NSPS) when a bioreactor of this invention is installed at the last lift (the highest lift vertically) of a landfill;
- before each landfill field, including one or more bioreactor is covered, the infiltration center of each bioreactor can be used to apply liquids to the exposed landfill surface;
- the horizontal gas recovery pipes may be strategically located to allow for convenient vacuum pressure adjustment on the interior of the landfill;
- the landfill surface may be sloped to one end to allows for gravity drainage in the event of flooding;
- The piping for gas recovery may be sloped so that the lowest end of the gas recovery piping can be used as a liquid drain;
- the soil or clay edge of the landfill may be inwardly sloped at the surface of this bioreactor systems of this invention to inhibit gas and leachate breakouts or leaks;
- the infiltration piping and horizontal gas recovery piping can optionally be used for air addition.

One embodiment of a bioreactor system of this invention is shown in the Figures. This invention will be described with reference to the bioreactor system shown in FIGS. 1–9. However, this description of an exemplary embodiment is not intended to limit the scope of the claims in any manner.

FIG. 1 is a top view of a bioreactor 10 of this invention associated with a landfill slope without a cover material. FIG. 9 is an overhead view of a stand-alone bioreactor embodiment 10 of this invention. In most instances, the bioreactors of this invention will be installed as lifts are being added to landfills. Once a lift is complete, a bioreactor system of this invention will be installed and then addition compostable material such as municipal solid waste will be placed over the bioreactor systems of this invention. If the bioreactor system is installed on top of the last landfill lift, then the bioreactor system can be covered with a cap material as discussed below. Alternatively, the bioreactor systems of this invention may be stand alone bioreactors that are constructed independently from a landfill in order to remediate compostable materials including, but not limited to municipal solid waste, yard waste, agricultural waste, and so forth as well as combinations of different types of waste materials. For purposes of this invention, the term compostable material should be broadly interpreted to include any liquid or solid material that can act as a food source for aerobic and/or anaerobic microorganisms under aerobic and/or anaerobic compositing conditions.

Bioreactor 10 shown in FIG. 1 can have any length (X) with a total length of up to 2000 feet or more being possible. Moreover the landfill can have a width (Y) of any useful length with a maximum length exceeding 2000 feet. For purposes of this invention, the term "length" and "width" and their associated definitions may be switched. For example, if the landfill is long and narrow, the landfill width may be longer than the length. Generally, however, the dimension of the landfill that is parallel to the gas withdrawn and/or liquid infiltration piping will be the "length" dimension of bioreactor 10. The length to width ratio is not critical. However, it is preferred that the length to width ratio be at least 2:1 and at most about 5:1.

In FIG. 1, a confining layer 12 is located at the ends 14 and sides 16 of the bioreactor 10. When bioreactor 10 is associated with a landfill, then confining layer 12 will be associated only with the ends and sides of the bioreactor that lie on the outside perimeter of the landfill. In this instance, inner side 11 of bioreactor 10 includes a porous material layer 18' contiguous with the sidewall or slope of an adjoining bioreactor cell. A typical width of confining layer 12 is from about 50 feet to about 60 feet. However, the width of confining layer 12 may range from about 20 feet to about 80 feet and will still be useful.

Inside confining layer 12 is a porous gas recovery layer 18 such as tire chips, gravel, glass cullet, selected (low dust and drywall content) construction and demolition debris, or a double-sided geocomposite manufactured by GSE Lining Technology, Inc. Double-sided geocomposite is a sheet material consisting of a sheet of netting material sandwiched between two layers of felt material. The double-sided geocomposite material promotes the lateral transmission of water that permeates into the mesh center of the material. Porous gas recovery layer 18 may be covered with a geotextile sheet 19 (shown in FIG. 3) to further protect the gas recovery piping from liquid infiltration and to protect gas recovery layer 18 from becoming fouled and plugged with compostable material fines. Porous gas recovery layer 18 may have a thickness ranging from about 1 inch to about 24 inches or more with a thickness of from about 6 inches to about 18 inches being preferred. Porous gas recovery layer 18 defines a gas collection volume in which gas collection piping is preferably located. If Porous gas recovery layer 18 is a double-sided geocomposite, then the double-sided geocomposite sheet will be located above the gas collection piping.

Porous gas recovery layer 18 will vary in length depending upon the length of the bioreactor. A typical porous material layer will have a width of from about 60 feet to about 100 feet wide or greater. The ends of the porous material layer are typically about 40 feet to about 80 feet wide. If the landfill cell is greater than 400' to 500' in width, then more that one bioreactor can be placed laterally in the cells so liquids can be distributed across with width of the cell. Moreover, porous gas recovery layer 18 may be continuous—running the entire length and width of the bioreactor. Or porous gas recovery layer 18 may be discontinuous in which case porous material layer should be constructed in locations that essentially correspond to the locations where the gas recovery piping is perforated.

Next a berm 20 is placed inside the porous gas recovery layer 18. The purpose of berm 20 is to force liquids downward to inhibit liquids from entering the gas collection system. Berm 20 is typically made of a material selected from soil or clay. However, the material selected may be any material that is capable of containing a liquid and/or creating a liquid barrier between central core 22 of bioreactor 10 and porous gas recovery layer 18. In this regard, the preferred soil or clay material used in berm 20 can be substituted with a special waste material such as fly ash, asphalt, contaminated soil, a soil like material or waste material, or with a synthetic sheet by itself or in combination with the soil or clay or special waste material in order to decrease the area or thickness of berm 20. If a synthetic sheet is used for berm 20, then the synthetic sheet may be a single layer sheet or it may preferably be an impervious synthetic material sheet on which a material such as sand, dirt, or the like has been placed on a portion of the sheet after which the uncovered portion of the sheet is folded over the top of the material such that the edges of the synthetic material sheet are essentially united.

Berm 20 may be a continuous berm or discontinuous with a continuous berm being preferred. In FIG. 1 a continuous berm surrounds a liquid infiltration area that has a central core 22 that is preferably several feet wide. Central core 22 may be comprised of any liquid permeable material including but not limited to liquid permeable compostable material, stone, tire chips, glass cullet, selected construction and demolition debris, or any other similar liquid permeable materials. Central core 22 may be as narrow as about 10 feet and as wide as about 500 feet or wider. Central core 22 will typically be from about 40 feet to about 80 feet wide and it is typically terminated from about 25 to about 200 feet and more preferably from about 100 feet to about 150 feet from the edge of the bioreactor or landfill.

FIG. 2 is a side view of a landfill including a plurality of bioreactors 10 of this invention wherein the bioreactors are located on the same or different horizontal planes. When bioreactors are located on different horizontal planes, then they may be offset by a distance Z wherein Z may be from 10 feet to 100 feet or more but is preferably about 15 feet to about 25 feet. When a bioreactor 10 is located in the top-most lift of a landfill, then it is preferred that the bioreactor is covered with a compostable material layer 24 having a depth of from about 5 feet to about 50 feet and preferably from about 5 feet to 20 feet. Compostable material layer 24 forms a buffer zone between the top-most bioreactor 10' and the landfill surface that inhibits oxygen infiltration into the bioreactor, and/or that allows for better landfill surface grading. Bioreactors located at the top-most lift of a landfill may also be covered with a cap material 26 that is preferably selected from soil or clay. The optional cap material will generally have a thickness of from about 1 foot to 10 feet or more with a thickness of from 2 feet to 5 feet being more preferred. An optional barrier material layer 28 may be located between cap material 26 and bioreactor 10 and preferably between cap material 26 and compostable material layer 24. Barrier material layer 28 may be any material that inhibits water infiltration into bioreactor 10. An example of a useful barrier material layer 28 would include a plastic sheet material having a thickness of from about 10 to about 40 mils.

If a barrier material layer 28 is used in conjunction with one or more bioreactors located in a landfill, then barrier material layer 28 may cover one to all of the plurality of bioreactors. It is preferred however that barrier material layer 28 covers only those bioreactors 10 that are not located below a landfill slope 30 as shown in FIG. 2. Moreover, slope 30 should be great enough to allow rain water to run off of the landfill without causing flooding. A slope 30 having a grade of from 1:1 to about 10:1 or more would be useful with slopes ranging from about 2.5:1 to 5.6:1 being more preferred.

FIG. 3 is a cross section along line "A" in FIG. 1. This cross section shows some of the major infrastructure of bioreactor 10. However, the FIG. 3 cross-section does not show gas extraction piping, infiltration piping, and in situ well pipes. These features are, however, shown in the FIG. 4 cross-section and discussed below. As discussed above, ends 14 and sides 16 of bioreactor 10 include a confining layer 12 for example, soil or clay that is preferably 12 inches to 18 inches deep but that may be deeper or shallower as required. According to FIG. 3, confining layer 12 is preferably sloped towards central core 22 of bioreactor 10. Inside confining layer 12 is a porous gas recovery layer 18 that optionally covered with geotextile sheet 19 which includes felt.

Inside porous gas recovery layer 18 is berm 20. Berm 20 will typically be formed of soil and it may have a width of from about 6 inches to about 20 feet Berm 20 is more typically from about 6 feet to about 15 feet wide with about 10 feet wide being most preferred. However, berm 20 can be less than 10 feet wide.

Inside berm 20 is a central core 22 of porous material. Inside central core 22 is a central porous material layer 32. Central porous material layer 32 can be rock, gravel, tire chips, wood chips, selected construction and demolition debris, glass cullet or any combination of materials that form a porous layer. According to FIGS. 3–4, liquid infiltration piping 34 is located within central porous material layer 32. Liquid infiltration piping 34 includes a plurality of perforations 36 and is preferably located in central porous material layer 32 such that essentially every perforation 36 is covered by central porous material layer 32.

In the center of the inner most rectangle of FIG. 3 is central porous material layer 32 in which liquid infiltration piping 34 is located. In a preferred embodiment, liquid infiltration piping 34 is a 3" to 6" diameter HDPE perforated double pipe system as shown in FIG. 5. Central porous material layer 32 is preferably a coarse material such as non-calcareous stone or other non-compressible inert materials not affected by organic acids A preferred coarse material is a coarse rock and more preferably, a coarse rock that is non-calcareous in nature so as not to add in precipitation of iron, calcium and magnesium complexes. In another preferred embodiment, the course material is poorly graded rounded non-calcareous stones having a size of from about ⅜ inch to about 1 inch. In some instances liquid infiltration piping 34 can be used to inject compressed air into this area of the bioreactor. Moreover, when sufficient liquids have been added to a bioreactor though liquid infiltration piping 34, the liquid infiltration piping 34 can be converted into vacuum gas recovery piping.

In an optional embodiment, liquid infiltration piping 34 and/or central porous material layer 32 may be covered with a geotextile material sheet (not shown) such as felt or some other material useful in landfills as a barrier. The geotextile material acts as a barrier to prevent the porous material layer 32 and/or perforations 36 in liquid infiltration piping 34 from becoming plugged with compostable waste or any other material that is placed over bioreactor 10.

FIG. 4 is a cross-section of cell at section B/B. In the porous gas recovery layer 18, described previously, gas collection pipes 38 are placed on each side of the infiltration gallery which includes berm 20 and all of the features inside berm 20. Gas collection pipes 38 may be horizontal or non-horizontal with non-horizontal piping being preferred.

The term "non-horizontal" as used herein means that gas collection pipes 38 are at most 10 degrees from horizontal, preferably no less than ½ a degree from horizontal, and most preferably no more than 6 degrees from horizontal and no less than about 1 degree from horizontal. Non-horizontal gas collection piping is preferred because any water that infiltrates the gas collection piping has a chance to be drained from the system. It is also preferred that the end of gas collection piping 38 that emerges from the bioreactor and that is connected to the gas recovery system is lower that the end of the gas collection piping 38 that is located in porous gas recovery layer 18 to allow liquid to be drained from gas collection piping 38 to the exterior of the bioreactor or landfill. If the field or bioreactor is long enough, two gas collection pipes 38 and 38' are located on either side of the infiltration gallery.

Pictured in plan view in FIG. 4 are a plurality of well pipes 44 that have a first end 46 that is placed adjacent to or in porous gas recovery layer 18. Well pipes 44 are angled downwardly towards of the inner portion of the cell such that well pipe second end 48 is located adjacent to or below the central core 22 where liquids are applied to the bioreactor. First end 46 of well pipes 44 will typically be about 2 feet to 20 feet and more preferably from about 5 feet to 12 feet higher than well pipe second end 48. Moreover, well pipe 44 will typically be 3 inches to 6 inches in diameter but may be larger or smaller as required. The spacing of these "in-situ" well pipes 44 is preferably between about 50 feet to about 200 feet but may be more or less as required. Well pipes 44 serve the dual function of recovery of gas from the saturated area, and drainage of liquid from the gas recovery layer. The vertical window installed in the trash for drainage, also functions to break up the daily cover that remained after filling operations. This, in turn, leads to improved liquid drainage. Additional windows may be installed at the edge of the outer berm in order to facilitate vertical drainage and to improve gas collection. In a preferred embodiment, second end 48 of in situ well pipe 44 can be located in a sump 50. Sump 50 is a lateral sump constructed from a liquid permeable material or pipe that allows liquids in the bioreactor to flow to a collection point where they can be recirculated or pumped from the bioreactor or landfill and disposed of.

According to FIGS. 1 and 4, bioreactors 10 of this invention include one or more gas collection pipes 38. Gas collection pipes 38 will typically enter a bioreactor 10 from both ends. In shorter bioreactors—bioreactors less than 500' to 600' in length—only single short pipes of 150 feet to 200 feet in length each need to be placed so that they are located in the porous gas recovery layer 18. Typically gas collection pipes 38 will include a solid (non-perforated) portion 40 and a perforated portion 42. The length of the solid and perforated portions will vary depending upon the length of bioreactor 10. Typically gas collection pipe will have a length that is from about 10% to about 50% or more of the length of the bioreactor. The length of the solid portion 40 will be from about 10% to about 50% of the total length of the gas collection pipe 38. The diameter of gas collection pipes 38 will typically vary from about 2 inches to about 12 inches in diameter and more preferably from about 3 inches to 8 inches. 4 inch piping is the most commonly used piping for bioreactor applications.

If bioreactor 10 is long (>600 feet) additional gas collection pipes 38 may optionally be added at one or both ends 14 of the bioreactor. Preferably, such extensions will have a perforated portion 42 that is in a different lateral location in the bioreactor in comparison to an adjacent gas collection pipe 38. Such adjacent gas collection pipes are identified by numerals 38 and 38' in FIG. 1. Such extensions are important as they allow for low vacuum pressure extraction from across the entire bioreactor 10. Without the optional extensions, too much vacuum will would have to be applied to the gas collection pipes 38 to extract gas resulting in the potential for short circuit and the possible collection of oxygen.

Gas collection pipes 38 and extension pipes 38' can also be used for external air addition to the bioreactor. Compressed air addition for short periods of time up to about 120 days or more and perhaps yearly may be useful to facilitate accelerated aerobic bacterial degradation of the compostable material and generate heat as set forth in U.S. Pat. No. 6,288,676, the specification of which is incorporated herein by reference.

FIG. 5 is an example of one embodiment of liquid infiltration piping 34 that is useful in the bioreactors of this invention. Any type of piping that can be perforated may be used in the bioreactors of the present invention. Because of cost and corrosion issues, it is preferred that liquid infiltration piping 34 is a plastic or resin piping material such as HDPE or SDR17 if the piping is buried less than 60 feet in the landfill. If the piping will be buried deeper than 60 feet, tile piping that is bedded in stone or SDR11 piping is preferred. In some cases liquid infiltration piping 34 can be enclosed in reinforced manifolds that allow heavy equipment to travel over the piping without damaging the piping while the pipes are still at a shallow location in the landfill. Black iron piping, HYEX® (a registered Trademark of Landfill Services Corp.) piping, or other reinforced material piping can also be used.

FIG. 5 depicts an embodiment of a liquid infiltration pipe 34. Liquid infiltration pipe 34 has to parallel lengths 35 linked by a plurality of crossover pipes 37. One or more crossover pipes 37 may be used. Crossover pipes may be solid or they may be perforated with solid crossover pipes being preferred. FIG. 6 is a close up view of crossover pipes 37 associated with to parallel lengths 35 of piping. FIG. 7 is a view of a piping manifold 39 that unites a plurality of parallel lengths of 10 piping 35 with the liquid infiltration piping inlet 41.

Functionally the bioreactors of this invention does one or more of the following: they eliminate vertical wells and their maintenance; place the gas collection headers on the outside landfill slope where they can be easily maintained; they allow for the addition of large volumes of liquid with gas collection compliance; and they allow for tuning of the wells, while minimizing the number of wells that have to monitored. The bioreactors of this invention provide secondary useful features including separating liquid addition and gas recovery but allowing for simultaneous liquid addition and gas removal. Furthermore the angled gas collection wells allows for gas recovery from a saturated area. In addition, the bioreactors of this invention allow for compressed air addition in both the infiltration and gas recovery area. Moreover, the systems of this invention provides an extremely large gas recovery area. For example, when the bioreactors of this invention are installed in, a landfill of 5.9 acres, then 184,800 square feet can be used for gas recovery. If the infiltration area is removed the gas recovery area is 135,800 square feet. This type of cell configuration in the prior art would employ 6 to 12 vertical wells. The porous surface area per well (3' diameter×70' deep) is about 675 square feet, thus the comparable filtration area is 4050 to 8100 square feet. Thus the bioreactors of this invention provide up to two orders of magnitude more surface area than conventional systems.

FIG. 8 is a bioreactor embodiment of this invention installed in a sloped landfill and including infiltration and gas recovery systems. Bioreactor 10 includes liquid infiltration piping 34 and gas collection piping 38. Gas collection piping 38 includes an end that emerges from side 16 of bioreactor 10. The emerging end of gas collection piping 38 enters a valve vault 60 including valves for directing liquid and gases withdrawn from gas collection piping 38 to the appropriate collection system. A barometric trap 62 for collecting liquids that drain from sloped gas collection piping 38 lies downstream of valve vault 60. A conduit 64 links each barometric trap 62 with typical leachate collection system. A conduit 66 links gas collection piping 38 with a landfill gas processing unit 68. Landfill gas processing unit 68 may be selected from any devices known to those of ordinary skill in the art for processing landfill gases. Such processing units include flares, gas recovery systems in which the gasses are scrubbed and burned for heat or to operate equipment and so forth.

The landfill bioreactor of FIG. 8 further includes a liquid injection conduit 70 associated with liquid infiltration piping 34. Liquid injection conduit may be used to supply leachate, water or other liquids from a tank 72. The landfill bioreactor of FIG. 8 further includes an optional air injection conduit 74 associated with air compressor 76. Air injection conduits 74 can be used to inject compressed air into the landfill via liquid infiltration piping 34 and/or gas collection piping 38.

From the foregoing it will be appreciated that, although specific embodiments of the invention have been described herein for purposes of illustration, various modifications may be made without deviating from the spirit and scope of the invention

What is claimed is:

1. A bioreactor comprising:
   a compostable material; and
   at least one bioreactor cell located in the compostable material wherein the bioreactor cell further comprises:
   i. a central core including liquid infiltration piping;
   ii. a porous gas recovery material including at least one gas collection pipe wherein the at least one gas collection pipe is selected from a horizontal gas collection pipe and a non-horizontal gas collection pipe; and
   iii. a berm located between the central core and the porous gas recovery material.

2. The bioreactor of claim 1 wherein the berm is a continuous berm.

3. The bioreactor of claim 1 wherein the central core is liquid permeable material.

4. The bioreactor of claim 3 wherein a central porous material is located in the central core and wherein the at least one gas collection pipe is located in the central porous material.

5. The bioreactor of claim 4 wherein the central porous material is selected from stone, wood chips, glass, cullet, selected construction and demolition debris, or any combination thereof.

6. The bioreactor of claim 1 wherein the porous gas recovery material is sloped towards the berm.

7. A bioreactor comprising:
   a compostable material; and
   at least one bioreactor cell located in the compostable material wherein the bioreactor cell further comprises:
   a central core including liquid infiltration piping;
   ii. a porous gas recovery material including at least one gas collection pipe;
   iii a berm separating the central core from the porous gas recovery material; and
   iv. at least on in situ well pipe having a first end associated with the porous gas recovery material and a second end associated with the central core.

8. The bioreactor of claim 7 wherein the central core further includes at least one sump and the second end of the in situ well pipe is located in the sump.

9. The bioreactor of claim 7 including a plurality of in situ well pipes.

10. The bioreactor of claim 7 wherein at least one gas collection pipe is sloped downwardly in relation to a center of the bioreactor.

11. The bioreactor of claim 7 wherein the at least one collection pipe has a perforated portion located in the porous gas recovery material.

12. The bioreactor of claim 11 wherein the at least one gas collection pipe includes a sold portion that emerges from an edge of the bioreactor.

13. The bioreactor of claim 7 including at least two gas collection pipes located in the porous gas recovery material.

14. The bioreactor of claim 13 including at least two gas collection pipes, each gas collection pipe including a perforated portion wherein the at least two perforated portions are not adjacent to one another.

15. The bioreactor of claim 7 wherein the berm is covered by a barrier material layer.

16. The bioreactor of claim 7 wherein the berm is a barrier material layer.

17. The bioreactor of claim 7 wherein the porous gas recovery material is covered with a geotextile.

18. The bioreactor of claim 7 wherein the bioreactor is located on top of a layer of compostable material.

19. The bioreactor of claim 18 including a layer of compost located between the central core the porous gas recovery material and the compostable material.

20. A landfill including at least one bioreactor of claim 7.

21. The landfill of claim 20 including a plurality of bioreactors.

22. The landfill of claim 21 wherein at least two bioreactors are vertically separated.

23. The landfill of claim 20 wherein the bioreactor is located in the uppermost lift of the landfill.

24. The landfill of claim 23 wherein the bioreactor is separated from the landfill surface by at least one layer selected from a compostable material layer and cap material layer.

25. The landfill of claim 23 wherein the bioreactor is separated from the landfill surface by a compostable material layer that is located on the bioreactor and by a cap material layer that is located on top of the compostable material layer.

26. The landfill of claim 24 wherein a barrier material is located between the landfill surface and bioreactor.

27. The landfill of claim 24 wherein a gas extraction header is located external to the landfill.

28. A method for constructing a landfill bioreactor comprising the steps of:
   a. placing a layer of compostable material in a landfill;
   b. locating the bioreactor of claim 7 on top of the layer of compostable material; and
   c. placing a layer of material over the bioreactor.

29. The method of claim 28 wherein the porous gas recovery material is a layer of porous gas recover material and wherein a plurality of porous gas recovery material layers are placed on the layer of compostable material.

30. The method of claim 29 wherein the layer of material of step (c) is a second layer of compostable material and wherein at least one porous gas recovery material layer is located on the second layer of compostable material.

31. The method of claim 28 wherein the at least one gas collection pipe is associated with a landfill gas recovery system.

32. The method of claim 28 wherein the at least one liquid infiltration pipe is associated with a leachate recycle system.

33. A landfill comprising:
   a compostable material; and
   a plurality of bioreactor cells each located in the compostable material wherein each bioreactor cells further comprises:
   i. a central core including liquid infiltration piping;
   ii. a porous gas recovery material including at least one gas collection pipe wherein the at least one gas collection pipe is selected from a horizontal gas collection pipe and a non-horizontal gas collection pipe; and
   iii a berm separating the central core from the porous gas recovery material and wherein at least two bioreactors are located on the same or on different horizontal planes.

34. The landfill of claim 33 wherein the liquid infiltration piping is associated with a liquid injection conduit.

* * * * *

UNITED STATES PATENT AND TRADEMARK OFFICE
CERTIFICATE OF CORRECTION

| | | |
|---|---|---|
| PATENT NO. | : 7,118,308 B2 | Page 1 of 1 |
| APPLICATION NO. | : 10/877637 | |
| DATED | : October 10, 2006 | |
| INVENTOR(S) | : Hater et al. | |

It is certified that error appears in the above-identified patent and that said Letters Patent is hereby corrected as shown below:

At column 8, line 42, delete "10".

At column 11, line 13, delete "cells" and replace with -- cell --.

At column 10, line 3, delete "on" and replace with -- one --.

At column 10, line 18, delete "sold" and replace with -- solid --.

Signed and Sealed this

Second Day of January, 2007

JON W. DUDAS
*Director of the United States Patent and Trademark Office*